Patented Nov. 10, 1931

1,831,226

UNITED STATES PATENT OFFICE

JAMES NORMAN BYRD, OF BALTIMORE, MARYLAND

BITUMINOUS RUBBER COMPOSITION

No Drawing.   Application filed October 24, 1924.   Serial No. 745,656.

This invention relates to bituminous-rubber compositions and process of making same.

Among the objects of this invention is the production of bituminous-rubber compositions possessing superior properties than similar compositions heretofore made. A further object of this invention is to provide a bituminous-rubber composition which may be employed for waterproofing and binding and which application may be accomplished with greater facility than with compounds and compositions heretofore made. A still further object of this invention is to provide a convenient, efficient and cheap method for making my bituminous-rubber composition.

In carrying out my invention, I take an emulsion or substantially permanent suspension of bituminous material or a pitch and add thereto an emulsion or substantially permanent suspension of rubber. The emulsion or suspension of bituminous material or pitch is employed in the liquid phase and is stabilized by soaps, clay or other protective colloid. My preferred emulsion or suspension of rubber is crude rubber latex, which is usually stabilized by ammonia or other stabilizing agent and should be preferably as free as possible from coagulated matter. The proportion of the constituents vary with the particular needs and fancy of the user and the purposes for which the finished product is desired.

The mixture may also have incorporated therewith a vulcanizing agent such as sulphur or the sulphur compounds employed for these purposes, and the product may then be vulcanized. When using a vulcanizing agent, it is advantageous to employ an accelerator and also an activator. The vulcanizing agent, accelerator and activator are added to the mixture in the form of suspensions.

When it is desired to give body to the composition, fillers such as carbon black, clay, or zinc oxide in a finely divided condition are added either in dry state or as liquid suspensions to the bituminous-rubber composition.

The preparation of the emulsion or suspension of bituminous material or pitch and of the protective colloid forms no part of this invention and may be accomplished by any of the methods now in use that yield a satisfactory product. Likewise, the preparation of the suspension or emulsion of rubber (when rubber material other than the latex is used) constitutes no part of this invention and may be carried out by any satisfactory process now in use.

A specific example of preparing my composition is as follows:

A bituminous material such as asphalt of rather low melting point is added to an aqueous paste of clay (about two parts of clay to one of water by weight) heated to a temperature below the boiling point of water for example, 150–180° F. The bituminous material is added gradually and the mixture agitated so that the colloidal clay and bituminous material are properly distributed, the colloidal clay serving as the emusifying agent. The size of the particles in this suspension of bituminous material in water is governed by the temperature of the paste and that of the bituminous material and the degree and nature of the agitation. The emulsion or suspension thus formed may be thinned to any desired consistency by the addition of water or other nonsolvent liquid.

The crude rubber latex is added to this emulsion or suspension of bituminous material and the mixture thoroughly stirred in order to insure a uniform product. The quantity of rubber latex added is dependent upon the amount of rubber desired in the final product. Ordinarily, the ratio of latex suspension to the suspension of bituminous material is from as high as 5 to 1 to as low as 1 to 5. Even in the cases of the higher ratios of latex suspension to the suspension of bituminous material, where the rubber content of the mixture is from 20–30%, the composition is of low viscosity and at the same time contains sufficient rubber therein so that the fabrics may be coated with sufficient thickness of coating material by a single dipping of the fabrics in such mixtures. This could not be accomplished with the prior bituminous-rubber compositions where, in lieu of the latex, solutions of rubber are used with suspensions of the bituminous material, for in order to provide a composition possessing sufficient rubber in the prior types of bituminous-rubber compositions, the introduction of the necessary amount of the rubber in such composition would result in such a high viscosity of the mixture as to render same impractical for application. If it is desired to vulcanize the rubber in this mixture, a sufficient quantity of a vulcanizing agent such as sulphur is added and thoroughly incorporated in the mixture. I prefer also to add an accelerator such as thiocarbanilide and also an activator such as zinc oxide.

This bituminous-rubber composition may now be used for incorporation with pigments or fillers such as carbon black, clay or zinc oxide. These materials are added to the bituminous-rubber suspension or emulsion and upon drying a continuous mass results, the particles of filler or pigment being coacted with a mixture of bituminous material and rubber. If desired this product may be vulcanized by heating.

Where it is desired to treat felts, fabrics or cloths with my bituminous-rubber composition, the cloth, fabric or felt is either dipped in this composition or else coated therewith and after drying may be vulcanized.

The preferred rubber latex employed for this purpose is latex of the Heveabrasiliensis or para-rubber, Manihot, Funtumia, and Ficus. Other latices may be employed whenever readily obtainable in the raw state in practically uncoagulated condition or where the amount of coagulated material is low.

Instead of rubber latex, I may employ artificial emulsions or colloidal suspensions of raw or reclaimed rubber. These are ordinarily prepared by mixing finely divided rubber with clay and water and then agitating the mixture while heating and subjecting to pressure.

Suitable accelerators for this purpose are ethylideneaniline, hexamethylenetetramine, thiocarbanilide etc. However the other accelerators commonly employed with vulcanizers may also be used without departing from the spirit and scope of this invention. A suitable activator for this purpose is zinc oxide. Certain other zinc salts, such as stearate or oxalate, function in the same way as zinc oxide.

In the specific example here given, I have specified an asphalt of low melting point, since suspensions of these materials are commonly employed for industrial uses. However, my invention is applicable to other substances, chief among which are asphalts and blended asphalts including those derived from petroleums of asphaltic base, the so-called natural asphalts, gum resins, blown oils and also pitches derived from coal tar, wood tar and stearine. These bituminous and asphaltic materials, pitches, gum resins, blown oils, etc., may be employed singly or in combination. In operating with materials of higher melting points, it will be found advantageous to use an autoclave in the preparation of the suspension or emulsion of the material in water containing a protective colloid, in order to admit of operation at higher temperatures. Also, in preparing these emulsions and suspensions other colloids may be used in lieu of clay, for example, resinate or oleate soaps.

My bituminous-rubber composition finds application as a waterproofing agent and binding material in the manufacture of numerous articles employing felt, cloth fabric, cork, asbestos etc. for example cork flooring, roofing felt, rubber coated cloth, boots, shoes, paper, and paper containers, rubber hose, saturation of cord for cord tires, insulation, etc.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claim.

I claim as my invention:

A composition comprising an admixture of a suspension of bituminous material in water containing a protective colloid and stabilized rubber latex, said composition having low viscosity and high rubber content.

In testimony whereof I affix my signature.

JAMES N. BYRD.